US011655150B2

(12) United States Patent
Lee et al.

(10) Patent No.: US 11,655,150 B2
(45) Date of Patent: May 23, 2023

(54) PREPARATION METHOD FOR LITHIUM PHOSPHATE, PREPARATION METHOD FOR LITHIUM HYDROXIDE, AND PREPARATION METHOD FOR LITHIUM CARBONATE

(71) Applicants: POSCO, Pohang-si (KR); RESEARCH INSTITUTE OF INDUSTRIAL SCIENCE & TECHNOLOGY, Pohang-si (KR)

(72) Inventors: Hyun Woo Lee, Pohang-si (KR); Woonkyoung Park, Pohang-si (KR); Heok Yang, Pohang-si (KR); Kwang Seok Park, Pohang-si (KR); Seung Taek Kuk, Pohang-si (KR); Ki Young Kim, Pohang-si (KR); Sang Gil Lee, Pohang-si (KR); Woo Chul Jung, Pohang-si (KR); Gi-Chun Han, Cheongju-si (KR); Juyoung Kim, Pohang-si (KR); Young-Seon Ko, Seoul (KR); Jin Yeop Wi, Pohang-si (KR)

(73) Assignees: POSCO CO., LTD, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 366 days.

(21) Appl. No.: 16/956,836

(22) PCT Filed: Dec. 18, 2018

(86) PCT No.: PCT/KR2018/016142
§ 371 (c)(1),
(2) Date: Jun. 22, 2020

(87) PCT Pub. No.: WO2019/124941
PCT Pub. Date: Jun. 27, 2019

(65) Prior Publication Data
US 2020/0407225 A1 Dec. 31, 2020

(30) Foreign Application Priority Data

Dec. 22, 2017 (KR) .................... 10-2017-0178668
Dec. 22, 2017 (KR) .................... 10-2017-0178669
(Continued)

(51) Int. Cl.
$C01D\ 15/08$ (2006.01)
$C01B\ 25/30$ (2006.01)
(Continued)

(52) U.S. Cl.
CPC .............. $C01B\ 25/30$ (2013.01); $B01D\ 15/00$ (2013.01); $B01D\ 21/01$ (2013.01); $B01D\ 61/445$ (2013.01);
(Continued)

(58) Field of Classification Search
CPC ........ C01B 25/30; B01D 15/00; B01D 21/01; B01D 61/445; B01D 53/04; B01D 61/422;
(Continued)

(56) References Cited

U.S. PATENT DOCUMENTS 3,306,700 A 2/1967 Neipert et al.
4,472,362 A 9/1984 Burba, III
(Continued)

FOREIGN PATENT DOCUMENTS

CN 1558871 A * 12/2004 ............ B01D 61/44
CN 103517877 A 1/2014
(Continued)

OTHER PUBLICATIONS

Weng, Ding, et al. "Introduction of manganese based lithium-ion Sieve—A review." Progress in Natural Science: Materials International 30.2 (2020): 139-152.*
(Continued)

Primary Examiner — Richard M Rump
(74) Attorney, Agent, or Firm — Morgan, Lewis & Bockius LLP

(57) ABSTRACT

The present invention relates to a method for producing lithium phosphate, comprising: passing a lithium-containing
(Continued)

solution through an aluminum-based adsorbent to adsorb lithium on the aluminum-based adsorbent, passing the distilled water or an aqueous solution having a lower lithium concentration than the lithium-containing solution through the aluminum-based adsorbent on which the lithium is adsorbed to obtain a lithium-containing desorption solution, and putting a phosphorous supplying material in the lithium-containing desorption solution to obtain lithium phosphate.

20 Claims, 5 Drawing Sheets

(30) Foreign Application Priority Data

Dec. 22, 2017 (KR) .................. 10-2017-0178811
Dec. 26, 2017 (KR) .................. 10-2017-0180117

(51) Int. Cl.
  $B01D\ 15/00$ (2006.01)
  $B01D\ 21/01$ (2006.01)
  $B01D\ 61/44$ (2006.01)
  $B01J\ 20/08$ (2006.01)
  $B01J\ 20/28$ (2006.01)
  $B01J\ 20/34$ (2006.01)
  $C01D\ 15/02$ (2006.01)

(52) U.S. Cl.
  CPC .......... $B01J\ 20/08$ (2013.01); $B01J\ 20/2803$ (2013.01); $B01J\ 20/28016$ (2013.01); $B01J\ 20/3433$ (2013.01); $B01J\ 20/3475$ (2013.01); $C01D\ 15/02$ (2013.01); $C01D\ 15/08$ (2013.01)

(58) Field of Classification Search
  CPC ..... B01D 61/44; B01J 20/08; B01J 20/28016; B01J 20/2803; B01J 20/3433; B01J 20/3475; B01J 20/04; B01J 20/30; C01D 15/02; C01D 15/08; C01P 2006/80
  See application file for complete search history.

(56) References Cited

U.S. PATENT DOCUMENTS

| | | | |
|---|---|---|---|
| 5,389,349 A | 2/1995 | Bauman et al. | |
| 5,599,516 A | 2/1997 | Bauman et al. | |
| 6,280,693 B1 | 8/2001 | Bauman et al. | |
| 8,753,594 B1 | 6/2014 | Burba, III et al. | |
| 9,034,294 B1* | 5/2015 | Harrison | C01D 15/08 |
| | | | 423/421 |
| 2012/0141342 A1 | 6/2012 | Alurralde et al. | |
| 2013/0129586 A1 | 5/2013 | Chon et al. | |
| 2017/0043317 A1 | 2/2017 | Boualleg et al. | |
| 2018/0166753 A1 | 6/2018 | Byun et al. | |
| 2018/0245180 A1* | 8/2018 | Cheng | B01J 20/28004 |

FOREIGN PATENT DOCUMENTS

| | | | |
|---|---|---|---|
| CN | 103579670 A | 2/2014 | |
| CN | 106946275 A | 7/2017 | |
| JP | 2003-245542 A | 9/2003 | |
| JP | 2004-142986 A | 5/2004 | |
| JP | 2009-161794 A | 7/2009 | |
| JP | 2009-269810 A | 11/2009 | |
| KR | 10-2012-0015658 A | 2/2012 | |
| KR | 10-2012-0060619 A | 6/2012 | |
| KR | 10-2012-0063424 A | 6/2012 | |
| KR | 10-2012-0070841 A | 7/2012 | |
| KR | 1238898 B1 * | 3/2013 | |
| KR | 10-2013-0078176 A | 7/2013 | |
| KR | 10-2013-0081158 A | 7/2013 | |
| KR | 10-2014-0017765 A | 2/2014 | |
| KR | 10-2015-0080872 A | 7/2015 | |
| KR | 10-2016-0133860 A | 11/2016 | |
| KR | 10-1674394 B1 | 11/2016 | |
| KR | 10-2017-0078617 A | 7/2017 | |
| KR | 10-1753092 B1 | 7/2017 | |
| WO | 2014/003363 A1 | 1/2014 | |
| WO | 2016/175613 A1 | 11/2016 | |
| WO | 2017/039724 A1 | 3/2017 | |

OTHER PUBLICATIONS

International Search Report and Written Opinion issued in corresponding International Application No. PCT/KR2018/016142 dated Apr. 5, 2019, with English translation.
Supov, V.P. et al., "Aluminum hydroxide as selective sorbent of lithium salts from brines and technical solutions", Studies in surface science and catalysis, 120:621-652, Dec. 1999 (Abstract).
Ryabtsev, A. D. et al., "Sorption of Lithium from Brine onto Granular LiCl * 2Al(OH)3 * mH2O Sorbent under Dynamic Conditions", Russian Journal of Applied Chemistry, vol. 75, No. 7, 2002, pp. 1069-1074.
English translation of China University of Mining and Technology Press, Water Pollution Control Engineering, Jan. 2017, pp. 159-160.
S. Magaino, et al., "Deposition and Dissolution Mechanism of Lithium on Aluminum Substrate," Electrochemistry, vol. 67, Issue 9, 1999, pp. 903-911.

* cited by examiner

[FIG 1]
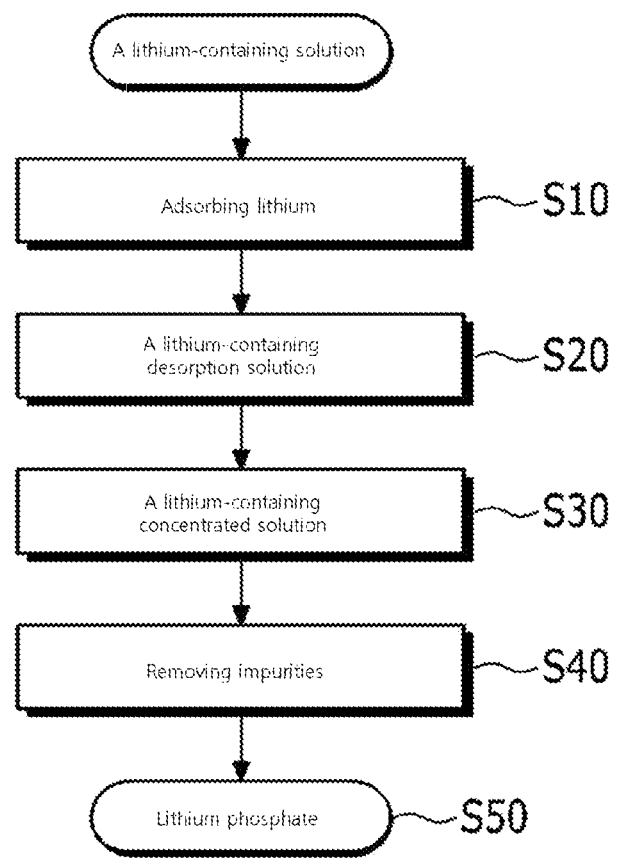

[FIG 2]
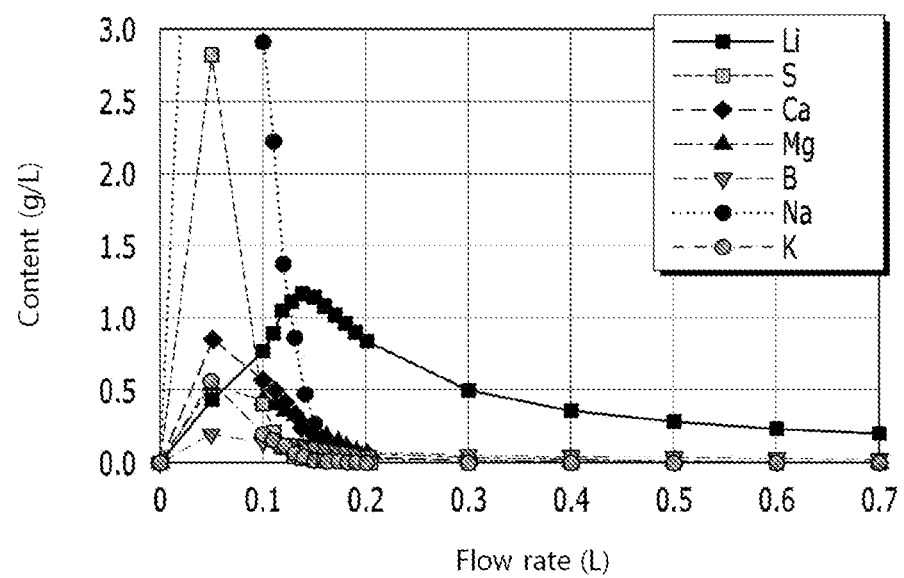

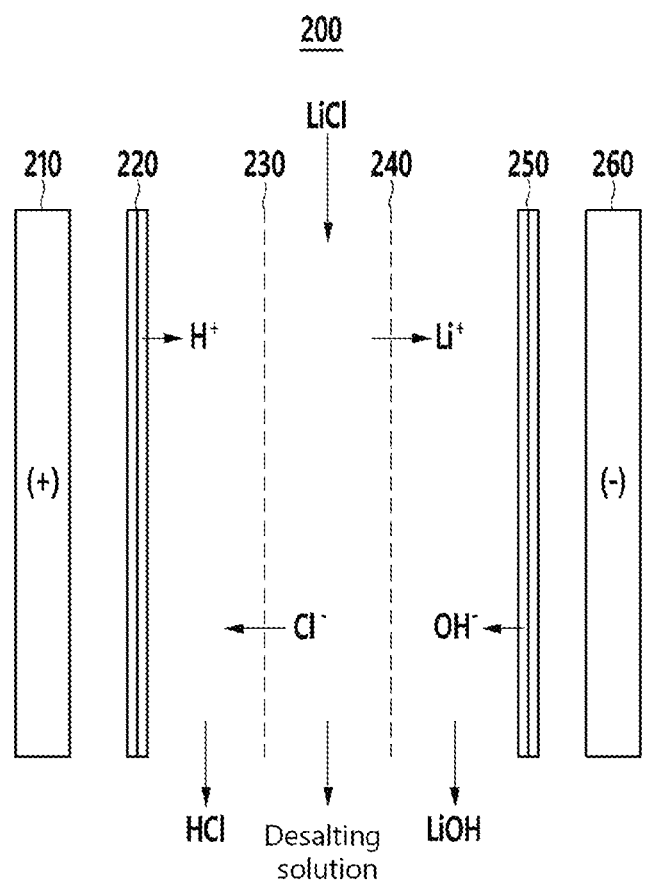
[FIG 3]

[FIG 4]
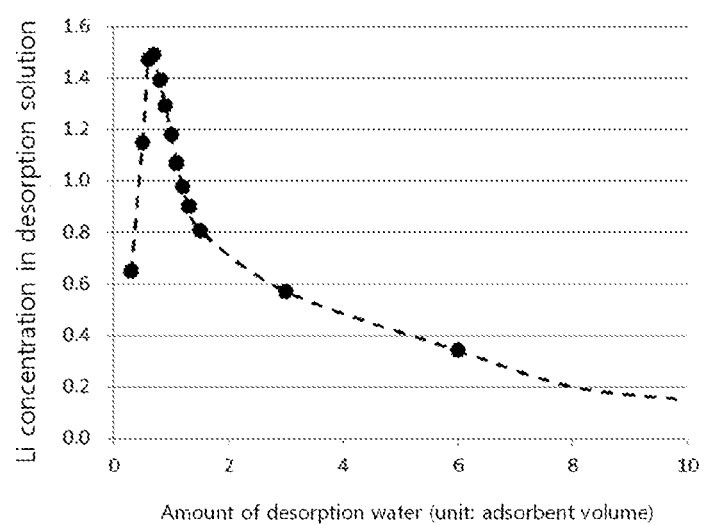

[FIG 5]
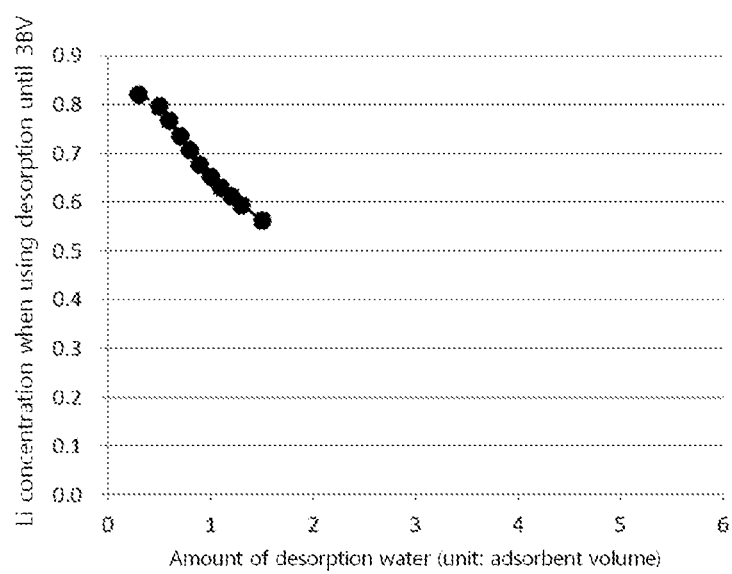

PREPARATION METHOD FOR LITHIUM PHOSPHATE, PREPARATION METHOD FOR LITHIUM HYDROXIDE, AND PREPARATION METHOD FOR LITHIUM CARBONATE

CROSS REFERENCE

This application is the U.S. National Phase under 35 U.S.C. § 371 of International Application No. PCT/KR2018/016142 filed on Dec. 18, 2018, which claims the benefit of Korean Application Nos. 10-2017-0178668, 10-2017-0178669 and 10-2017-0178811, all filed on Dec. 22, 2017 and Korean Patent Application No. 10-2017-0180117 filed on Dec. 26, 2017, the entire contents of each application is hereby incorporated by reference herein.

FIELD OF THE INVENTION

Embodiments of the present invention are related to a method for producing lithium phosphate, a method for producing lithium hydroxide and a method for producing lithium carbonate, and more particularly, to a method for effectively producing lithium phosphate from brine.

TECHNICAL BACKGROUND

Recently, the demand for lithium secondary batteries has been rapidly increasing due to the rapid growth of related markets such as electric vehicles. Therefore, the demand for lithium hydroxide, which is one of the raw materials for lithium which is a core raw material of lithium secondary batteries, is also increasing rapidly.

Such lithium carbonate or lithium hydroxide is generally produced by extracting lithium comprised in brine or seawater etc. in the form of lithium phosphate and then converting to lithium carbonate or lithium hydroxide.

However, since the content of lithium in the seawater is as low as 0.17 mg/L, the efficiency of lithium extraction is low and the production cost is higher than other lithium raw material.

Further, in order to extract lithium from the brine, there is a problem that the productivity is low because the lithium concentration must be concentrated to a certain level through a process such as natural evaporation and then the recovery process must be performed.

Therefore, it is urgent to develop a technique capable of efficiently extracting lithium from the lithium-containing solution.

CONTENTS OF THE INVENTION

Problem to Solve

The present embodiments are intended to provide a production method capable of producing lithium phosphate, lithium hydroxide or lithium carbonate from a lithium-containing solution economically and efficiently.

SUMMARY OF THE INVENTION

In an embodiment of the present invention, it provides a method for producing lithium phosphate, comprising: passing a lithium-containing solution through an aluminum-based adsorbent to adsorb lithium on the aluminum-based adsorbent, passing the distilled water or an aqueous solution having a lower lithium concentration than the lithium-containing solution through the aluminum-based adsorbent on which the lithium is adsorbed to obtain a lithium-containing desorption solution, and putting a phosphorous supplying material in the lithium-containing desorption solution to obtain lithium phosphate Before the step of putting a phosphorous supplying material in the lithium-containing desorption solution to obtain lithium phosphate; a step of removing impurities in the lithium-containing desorption solution may be further comprised.

The step of removing impurities in the lithium-containing desorption solution may be a step of separating the impurities physically by passing the lithium-containing desorption solution through a filtration membrane having different permeability of monovalent ions and divalent ions; a step of putting a precipitant in the lithium-containing desorption solution to remove impurities; or a step of removing impurities by electrodialysis method using a monovalent cation selective permeable membrane.

The impurities to be removed in the step of removing impurities may be divalent cation.

The divalent cation may comprise at least one of calcium, magnesium and strontium The precipitant put in the step of removing impurities may be at least one of sodium hydroxide (NaOH), sodium carbonate ($Na_2CO_3$), calcium hydroxide ($Ca(OH)_2$), sodium sulfate ($Na_2SO_4$), ammonium hydroxide ($NH_4OH$), ammonium carbonate ($(NH_4)_2CO_3$), ammonium sulfate ($(NH_4)_2SO_4$) and potassium hydroxide (KOH).

The precipitant put in the step of removing impurities may be sodium carbonate ($Na_2CO_3$).

The content of the precipitant put in the step of removing impurities may be in the range of 1 equivalent to 2 equivalents on the basis of the equivalent of the impurity ions.

Before the step of putting a phosphorous supplying material in the lithium-containing desorption solution to obtain lithium phosphate; a step of using electrodialyser to concentrate the lithium-containing desorption solution; or a step of concentrating the lithium-containing desorption solution using a reverse osmosis method; may be further comprised.

The electrodialyser may be which a cathode cell comprising a cathode separation membrane, an anion selective-type permeable membrane which is selectively permeable to anions, a cation selective-type permeable membrane which is selectively permeable to cations, and an anode cell comprising an anode separation membrane are disposed in a sequential order.

The concentration of lithium which is concentrated may be 1 g/L to 15 g/L.

In the step of putting a phosphorous supplying material in the lithium-containing desorption solution to obtain lithium phosphate; a pH adjusting agent may be added together with the phosphorus supplying material.

The concentration of lithium in the lithium-containing solution may be 0.1 g/L to 2.0 g/L The aluminum-based adsorbent may comprise an adsorbent powder and a binder.

The aluminum-based adsorbent may comprise aluminum hydroxide.

The step of obtaining the lithium-containing desorption solution may be performed by passing the distilled water or an aqueous solution having a lower lithium concentration than the lithium-containing solution through a content of 0.5 to 10 times on the basis of the volume of the aluminum-based adsorbent on which the lithium is adsorbed. Preferably it may be performed with 0.5 to 3 times.

In the step of obtaining the lithium-containing desorption solution, the lithium-containing desorption solution obtained by passing the distilled water or an aqueous solution having a lower lithium concentration than the lithium-containing solution through a content of 0.5 to 3 times on the basis of the volume of the aluminum-based adsorbent on which the lithium is adsorbed may be used in subsequent process, and the desorption solution used more than 3 times may be reused for next desorption of the lithium adsorbent.

The concentration of lithium comprised in the lithium-containing desorption solution may be in the range of 0.2 g/L to 2.0 g/L. Preferably it may be 1.0~1.5 g/L.

The step of using electrodialyser to concentrate the lithium-containing desorption solution; may be performed 2 times or more.

In another embodiment of the present invention, it provides a method for producing lithium hydroxide, comprising: passing a lithium-containing solution through an aluminum-based adsorbent to adsorb lithium on the aluminum-based adsorbent; passing the distilled water or an aqueous solution having a lower lithium concentration than the lithium-containing solution through the aluminum-based adsorbent on which the lithium is adsorbed to obtain a lithium-containing desorption solution; and injecting the lithium-containing desorption solution into a bipolar electrodialyser to obtain an aqueous solution of lithium hydroxide.

In another embodiment of the present invention, it provides a method for producing lithium carbonate, comprising: passing a lithium-containing solution through an aluminum-based adsorbent to adsorb lithium on the aluminum-based adsorbent; passing the distilled water or an aqueous solution having a lower lithium concentration than the lithium-containing solution through the aluminum-based adsorbent on which the lithium is adsorbed to obtain a lithium-containing desorption solution; injecting the lithium-containing desorption solution into a bipolar electrodialyser to obtain an aqueous solution of lithium hydroxide; and carbonating the obtained aqueous solution of lithium hydroxide to obtain lithium carbonate.

In another embodiment of the present invention, it provides a method for producing lithium carbonate, comprising: passing a lithium-containing solution through an aluminum-based adsorbent to adsorb lithium on the aluminum-based adsorbent; passing the distilled water or an aqueous solution having a lower lithium concentration than the lithium-containing solution through the aluminum-based adsorbent on which the lithium is adsorbed to obtain a lithium-containing desorption solution; and carbonating the desorption solution to obtain lithium carbonate.

As the carbonation method, a method of reacting a lithium-containing solution with a carbonating gas (for example, carbon dioxide) may be used.

Alternatively, a method of putting carbonate in the lithium-containing solution to obtain lithium carbonate may be used. As an example of the carbonate used at this time, sodium carbonate ($Na_2CO_3$) may be used.

Effect of the Invention

According to the embodiments, since lithium is adsorbed from lithium-containing solution using an aluminum-based adsorbent and then a concentration process using electrodialysis is subjected to and then lithium phosphate is produced, lithium phosphate may be produced economically and efficiently from a solution having a low lithium content.

BRIEF DESCRIPTION OF THE DRAWINGS

FIG. 1 schematically shows a method for producing lithium phosphate according to an embodiment.

FIG. 2 shows the content of each element comprised in the solution obtained according to the flow rate of the distilled water passed through in the desorption step according to one embodiment.

FIG. 3 schematically shows a method for producing an aqueous solution of lithium hydroxide using a bipolar electrodialyser in the method for producing lithium hydroxide according to an embodiment.

FIG. 4 shows the results of analysis of the concentration of lithium in the desorption solution according to the amount of distilled water.

FIG. 5 shows the results of analysis of the concentration of lithium in the desorption solution when only a part of the desorption solution according to the amount of distilled water was used in the subsequent process.

DETAILED DESCRIPTION OF THE INVENTION

Hereinafter, the embodiments of the present invention will be described in detail with reference to the accompanying drawings in order to facilitate a person skilled in the art. The present invention may be embodied in many different forms and is not limited to the embodiments described herein.

In order to clearly illustrate the present invention, parts that are not related to the description are omitted, and the same or similar components are denoted by the same reference numerals throughout the specification.

In addition, the size and thickness of each component shown in the drawings are arbitrarily illustrated for convenience of explanation, and thus the present invention is not necessarily limited to those shown in the drawings.

Further, through the specification, unless explicitly described to the contrary, the word "comprise" and variations such as "comprises" or "comprising" will be understood to imply the inclusion of stated elements but not the exclusion of any other elements.

In the drawings, the thicknesses are enlarged to clearly indicate layers and regions. Similar parts are denoted by same reference numerals throughout the specification. It will be understood that when a part such as a layer, film, region, plate, or the like is referred to as being "on" another portion, it includes not only the case where it is "directly on" another part but also the case where there is another part in the middle. In contrast, when a part is "directly on" another part, it means that there is no other part in the middle.

Hereinafter, a method for producing lithium hydroxide according to embodiments of the present invention will be described in detail with reference to the drawings.

FIG. 1 schematically shows a method for producing lithium phosphate according to an embodiment.

Referring to FIG. 1, a method for producing lithium phosphate according to an embodiment of the present invention may comprise the steps of adsorbing lithium from a lithium-containing solution (S10), obtaining a lithium-containing desorption solution (S20); obtaining a lithium-containing concentrated solution (S30); removing impurities (S40); and obtaining lithium phosphate (S50).

First, the step of adsorbing lithium from the lithium-containing solution (S10) is performed.

Specifically, the lithium-containing solution is passed through an aluminum-based adsorbent to adsorb lithium on the aluminum-based adsorbent.

At this time, the concentration of lithium in the lithium-containing solution may be in the range of 0.1 g/L to 2.0 g/L, more specifically, 0.3 g/L to 1.0 g/L.

When the concentration of lithium in the lithium-containing solution is less than 0.1 g/L, the adsorption rate may be slow and productivity may be decreased. In addition, when the concentration of lithium in the lithium-containing solution is more than 2.0 g/L, the productivity is increased but the consumption of the adsorbent is increased and the economical efficiency is relatively decreased. Therefore, it is preferable that the concentration of lithium comprised in the lithium-containing solution satisfies the above range.

The aluminum-based adsorbent is for adsorbing lithium dissolved in the lithium-containing solution, and may comprise, for example, aluminum hydroxide. When an aluminum-based adsorbent comprising aluminum hydroxide is used as in the present embodiment, the amount of adsorption of lithium dissolved in the lithium-containing solution is high, and since there is little or no aluminum loss in the desorption process to be described later, the life of the adsorbent is long, so that it is advantageous in that the economic efficiency of the lithium extraction process is excellent.

More specifically, the adsorbent powder may include, at least one of aluminum hydroxide containing at least one of a Gibbsite crystal phase, a Bayerite crystal phase and a Doyleite crystal phase; and magnesium hydroxide containing a Brucite crystal phase.

In addition, the aluminum-based adsorbent may be a molded article which comprises an adsorbent powder and a binder.

The adsorbent powder may be, for example, an adsorbent powder comprising aluminum hydroxide. Advantages of using an adsorbent powder comprising aluminum hydroxide are the same as described above.

The binder is intended to make the adsorbent powder into a molded article in appropriate form, and it serves to bond the adsorbent powders together. The binder may comprise, for example, at least one of polyvinyl chloride (PVC), poly sulfone, and polyaniline. In particular, in the present embodiment, the binder preferably comprises polyvinyl chloride (PVC) capable of providing an excellent bonding force between adsorbent powders.

At this time, the molded article may comprise the binder in an amount in the range of 5 wt % to 30 wt %, more specifically from 10 wt % to 15 wt %, on the basis of the total weight of the adsorbent powder. When the content of the binder is less than 5 wt % on the basis of the total weight of the adsorbent powder, there is a problem that the strength after molding is low and the life of the adsorbent is short. In addition, when the content of the binder is more than 30 wt %, the amount of lithium adsorbed from the lithium-containing solution may be reduced since the amount of the adsorbent powder is relatively reduced. Therefore, it is preferable that the content of the binder satisfies the above range.

On the other hand, the step of passing the lithium-containing solution through the aluminum-based adsorbent to adsorb lithium on the aluminum-based adsorbent comprises, for example, the reaction of the following Reaction Scheme 1.

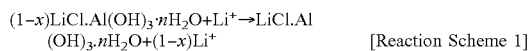
[Reaction Scheme 1]

Next, the step of obtaining a lithium-containing desorption solution (S20) is performed.

Specifically, the lithium-containing desorption solution may be obtained by passing the distilled water or an aqueous solution having a lower lithium concentration than the lithium-containing solution through the aluminum adsorbent on which lithium is adsorbed.

At this time, the amount of the distilled water or an aqueous solution having a lower lithium concentration than the lithium-containing solution passing through the aluminum adsorbent on which lithium is adsorbed, on the basis of the volume of the adsorbent, may be 0.5 to 10 times, more specifically 1 to 3 times of the amount of the adsorbent.

When the desorption process is performed using the distilled water or an aqueous solution having a lower lithium concentration than the lithium-containing solution having a volume of less than 0.5 times the volume of the adsorbent in the aluminum-based adsorbent on which lithium is adsorbed, there is a problem that the amount of desorption of lithium adsorbed on the adsorbent is reduced. In addition, when using the distilled water or an aqueous solution having a lower lithium concentration than the lithium-containing solution having a volume of more than 10 times the volume of the adsorbent, there is a problem that the desorbed lithium is diluted in the desorption process, which lowers the concentration of lithium comprised in the lithium-containing desorption solution.

More specifically, in the step of obtaining the lithium-containing desorption solution, the lithium-containing desorption solution obtained by passing the distilled water or an aqueous solution having a lower lithium concentration than the lithium-containing solution through a content of 0.5 to 3 times on the basis of the volume of the aluminum-based adsorbent on which the lithium is adsorbed may be used in subsequent process, and the desorption solution used more than 3 times may be reused for next desorption of the lithium adsorbent.

That is, the yield of the lithium compound may be maximized by utilizing the concentration of lithium in the desorption solution as high as possible in subsequent process. At the same time, after the desorption of lithium remaining in the adsorbent sufficiently, the desorption solution having a relatively low lithium concentration may be reused for desorption of the next lithium adsorbent, not for the subsequent process, so that the effect of concentrating of lithium may be expected.

The concentration of lithium comprised in the lithium-containing desorption solution obtained by the method as above may be in the range of 0.2 g/L to 2.0 g/L, more specifically 0.8 g/L to 1.5 g/L. When the concentration of lithium comprised in the lithium-containing desorption solution satisfies the above range, the recovery rate of lithium phosphate obtained after the subsequent process described below is excellent.

The step of passing the distilled water or an aqueous solution having a lower lithium concentration than the lithium-containing solution through the aluminum adsorbent on which lithium is adsorbed to obtain a lithium-containing desorption solution comprises, for example, the reaction of the following Reaction Scheme 2.

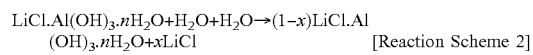
[Reaction Scheme 2]

Thereafter, the step of obtaining a lithium-containing concentrated solution (S30) is performed.

That is, the step of injecting the lithium-containing desorption solution to an electrodialyser to obtain a lithium-containing concentrated solution may be performed.

Alternatively, the lithium-containing desorption solution may be concentrated using a reverse osmosis method.

At this time, the electrodialyser may be which a cathode cell comprising a cathode separation membrane, an anion selective-type permeable membrane which is selectively permeable to anions, a cation selective-type permeable membrane which is selectively permeable to cations, and an anode cell comprising an anode separation membrane are disposed in a sequential order. Further, the electrode solution is injected into the anode cell and the cathode cell.

The step of obtaining the lithium-containing concentrated solution may be performed by injecting the lithium-containing desorption solution between the cathode separating membrane and the anion selective-type permeable membrane and between the cation selective-type permeable membrane and the anode separation membrane, respectively, injecting the distilled water between the anion selective-type permeable membrane and the cation selective-type permeable membrane, and then applying a current to the electrodialyser. That is, when a current is applied to the electrodialysis device after putting the lithium-containing desorption solution and the distilled water in as described above, the anion moves toward the anode and the cation moves toward the cathode due to the electrophoresis effect.

Therefore, the monovalent chloride ion in the lithium-containing solution may permeate the anion selective-type permeable membrane, and the monovalent lithium ion may permeate the cation selective-type permeable membrane in the direction opposite to the chlorine ion. Accordingly, between the cation selective-type permeable membrane and the anion permeable membrane, chloride ion and lithium ion may be continuously concentrated and made into an aqueous solution of lithium chloride.

On the other hand, between the anode separation membrane and the cation selective-type permeable membrane, and between the cathode separation membrane and the anion selective-type permeable membrane, a desalting solution with a significantly decreased concentration of lithium is produced.

In this step, the concentration of lithium comprised in the lithium-containing concentrated solution obtained may be in the range of 1 g/L to 15 g/L, more specifically 2 g/L to 6 g/L. When the concentration of lithium comprised in the lithium-containing concentrated solution is less than 1 g/L, there is a problem that the recovery rate is low when lithium phosphate is produced. Further, when the concentration of lithium in the lithium-containing concentrated solution is more than 15 g/L, the recovery rate of lithium is increased but the current efficiency is decreased when the electrodialysis is performed, so that the electricity cost may be increased.

Next, the step of removing impurities (S40) is performed.

Specifically, a step of putting a precipitant in the lithium-containing concentrated solution to remove impurities may be performed.

The content of the precipitant put in the step of removing the impurities may be 1 equivalent to 2 equivalents, more specifically 1.2 equivalents to 1.5 equivalents on the basis of the equivalents of the impurity ions. When the content of the precipitant to be put in satisfies the above range, the amount of that to be put in may be optimized while keeping the impurity removal rate high, so that it is very advantageous in that the impurities may be efficiently removed without using an excessive amount of the precipitant.

At this time, the impurities to be removed may be divalent cation, for example, at least one of calcium, magnesium and strontium.

When a precipitant is added to the lithium-containing concentrated solution, the divalent cations and the precipitant bond to each other to form precipitates, the impurities may be removed by removing them through solid-liquid separation.

Specifically, as a precipitant for removing the divalent cations, for example, at least one of sodium hydroxide (NaOH), sodium carbonate ($Na_2CO_3$), calcium hydroxide ($Ca(OH)_2$), sodium sulfate ($Na_2SO_4$), ammonium hydroxide ($NH_4OH$), ammonium carbonate (($NH_4)_2CO_3$), ammonium sulfate (($NH_4)_2SO_4$) and potassium hydroxide (KOH) may be used.

Of these, when sodium hydroxide or sodium carbonate is used as a precipitant, calcium and magnesium ions may be removed by the reaction of the following Reaction Scheme 3 and Reaction Scheme 4.

$$Me^{2+}+2NaOH \rightarrow Me(OH)_2+2Na^+ \quad \text{[REACTION SCHEME 3]}$$

$$Me^{2+}+Na_2CO_3 \rightarrow MeCO_3+2Na^+ \quad \text{[REACTION SCHEME 4]}$$

In the above Reaction Scheme 3 and Reaction Scheme 4, Me is Ca or Mg.

That is, the precipitates of $Ca(OH)_2$, $CaCO_3$, $Mg(OH)_2$, $MgCO_3$ and the like are formed by the reaction of Reaction Scheme 3 and Reaction Scheme 4, and calcium and magnesium ions may be removed by removing them through solid-liquid separation.

At this time, more preferably, sodium carbonate may be used. Sodium hydroxide is subjected to adjusting pH first before the impurity removal effect is obtained, so that the amount of sodium hydroxide to be put in is increased.

As may be seen from the examples described later, it may be seen that when sodium carbonate is used, the impurity removal effect is exhibited in various pH ranges.

Alternatively, impurities in the lithium-containing desorption solution may be removed by a method of separating the impurities physically by passing the lithium-containing desorption solution through a filtration membrane having different permeability of monovalent ions and divalent ions That is, in order to remove impurities, it may effectively remove impurities by using not only a chemical removal method as described above but a physical removal method.

Alternatively, impurities may be removed by electrodialysis method using the monovalent cation selective permeable membrane. The divalent ions may be effectively removed through the monovalent cation selective permeable membrane provided between the electrodes.

Thereafter, the step of obtaining lithium phosphate (S50) is performed.

Specifically, a step of putting the phosphorus supplying material in the lithium-containing concentrated solution from which the impurities are removed to obtain lithium phosphate may be performed.

The phosphorus supplying material may be at least one of phosphoric acid, phosphate, monohydrogen phosphate and dihydrogen phosphate, for example. In this embodiment, it is preferable that the phosphorus supplying material is phosphoric acid ($H_3PO_4$).

At this time, a pH adjusting agent (e.g. an alkali ion) may be further added for pH control, and a hydroxide anion may be used as the alkali ion. In order to supply the hydroxide anion, for example, sodium hydroxide, potassium hydroxide, ammonium hydroxide, and the like may be added, and preferably sodium hydroxide may be added.

Lithium phosphate salt precipitates at pH 9.5 or higher. Therefore, when the phosphorus supplying material is put in the lithium desorption solution from which the impurities are removed, the pH may be lowered so that it is preferable to put the pH adjusting agent together with phosphorus supplying material in for adjusting the pH to 9.5 or more.

At this time, the content of the phosphorus supplying material to be put in may be in the range of 0.5 equivalent to 1.5 equivalents, more specifically 1.0 equivalent to 1.2 equivalents on the basis of the lithium comprised in the lithium-containing concentrated solution from which the impurities are removed. When the amount of the phosphorus supplying material to be put in satisfies the above range, the recovery rate of lithium phosphate is high and an excessive amount of phosphoric acid is not put in, so that it is very advantageous in that the concentration of the residual phosphoric acid after the recovery of lithium phosphate is low.

On the other hand, in the case of further comprising the alkali ion, the content of the alkali ion to be put in may be in the range of 0.5 equivalent to 1.5 equivalents, more specifically 1.0 equivalent to 1.2 equivalents on the basis of the lithium comprised in the lithium-containing concentrated solution from which the impurities are removed. When the amount of the alkali ion to be put in is less than 0.5 equivalent, the recovery rate of lithium phosphate may be decreased. In addition, when the amount of the alkali ions to be put in is more than 1.5 equivalents, there is a problem that the amount of the alkali ions to be put in is increased and the economic efficiency is decreased. Therefore, in the case of further comprising the alkali ion, the amount of the alkali ion to be put in is preferable to satisfy the above range.

Specifically, a lithium phosphate slurry may be obtained by the reaction of the following Reaction Scheme 5 by putting a phosphorus supplying material in the lithium-containing concentrated solution from which the impurities are removed. At this time, it may be stirred appropriately to accelerate the reaction.

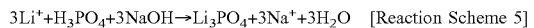

$$3Li^+ + H_3PO_4 + 3NaOH \rightarrow Li_3PO_4 + 3Na^+ + 3H_2O \quad \text{[Reaction Scheme 5]}$$

Next, the obtained lithium phosphate slurry is subjected to solid-liquid separation and drying to obtain lithium phosphate in powder form.

In order to separate the lithium phosphate precipitates from the lithium phosphate slurry, the method such as vacuum filtration, pressure filtration, centrifugation and the like may be used. The step of synthesizing and precipitating lithium phosphate through the reaction as shown in Reaction Scheme 5 may be performed at a temperature of greater than or equal to room temperature (about 15 degrees or more and about 25 degrees or less). At this time, the step of washing using distilled water may further be comprised to improve the purity before drying the obtained precipitates. After washing, the obtained precipitates may be dried to obtain lithium phosphate in powder form.

When a lithium-containing concentrated solution is obtained by using an electrodialyser after obtaining a lithium-containing desorption solution from a lithium-containing solution using an aluminum-based adsorbent, and then lithium phosphate is obtained after removing the impurities as in this embodiment, the recovery rate of lithium phosphate may be easily improved not only from a solution having a high lithium concentration but also from a solution having a low lithium concentration.

In addition, since a lithium-containing desorption solution is obtained from a lithium-containing solution using an aluminum-based adsorbent, a lithium-containing desorption solution having a high lithium concentration may be obtained as an intermediate product without adding any additional process such as using of an acid solution etc.

Therefore, finally, lithium phosphate having a high purity may be produced, and the lithium recovery rate may also be improved.

In an embodiment of the present invention, it provides a method for producing lithium hydroxide, comprising: passing a lithium-containing solution through an aluminum-based adsorbent to adsorb lithium on the aluminum-based adsorbent; passing the distilled water or an aqueous solution having a lower lithium concentration than the lithium-containing solution through the aluminum-based adsorbent on which the lithium is adsorbed to obtain a lithium-containing desorption solution; and injecting the lithium-containing desorption solution into a bipolar electrodialyser to obtain an aqueous solution of lithium hydroxide.

That is, the lithium ion comprised in the lithium-containing desorption solution may be converted directly to the form of lithium hydroxide through bipolar electrodialysis.

As described in the above embodiment of the present invention, the step of removing impurities in the lithium desorption solution may be further comprised, and a detailed description thereof is same so will be omitted.

Further, a configuration for concentrating the lithium-containing desorption solution may be additionally comprised, and a detailed description thereof is same so will be omitted here.

Thereafter, the step of obtaining lithium hydroxide is performed.

FIG. 3 schematically shows a process of converting to an aqueous solution of lithium hydroxide using a bipolar electrodialyser.

Referring to FIG. 3, the electrodialyser 200 used in the conversion process of the aqueous solution of lithium hydroxide may have a structure in which an anode cell comprising an anode 210, a first bipolar membrane 220, an anion selective-type dialysis membrane 230, a cation selective-type dialysis membrane 240, a second bipolar membrane 250, and a cathode cell comprising a cathode 260 are sequentially disposed.

In the step of converting to the aqueous solution of lithium hydroxide, the bipolar electrodialysis may be performed by injecting a concentrated solution obtained by the above-described method between the anion selective-type dialysis membrane 230 and the cation-selective dialysis membrane 240, and injecting the distilled water between the first bipolar membrane 220 and the anion selective-type dialysis membrane 230, and between the second bipolar membrane 250 and the cation selective-type dialysis membrane 240, respectively That is, when a voltage in the range of 1.8 to 2.2 V is applied to the bipolar electrodialyser into which the distilled water and the aqueous solution of lithium chloride, which is main component of the lithium desorption solution, are injected, Water-splitting occurs in each bipolar membrane, and the cations and the anions in the aqueous solution of lithium chloride move toward the cathode 260 and the anode 210 by the electrophoretic effect, respectively.

More specifically, Cl⁻ meets with hydrogen hydrolyzed in the first bipolar membrane 220 on the anode side and to be obtained as hydrochloric acid (HCl), and lithium ion moving toward the cathode through the cation selective-type membrane 240 reacts with OH⁻ generated in the second bipolar membrane 250 to be obtained as lithium hydroxide (LiOH). That is, the overall reaction is shown in the following Reaction Scheme.

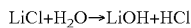

$$LiCl + H_2O \rightarrow LiOH + HCl$$

At this time, between the anion selective-type dialysis membrane 230 and the cation selective-type dialysis membrane 240, a desalting solution in which lithium and chlorine ions escape from the aqueous solution of lithium chloride, which is a raw material to be injected to the bipolar electrodialysis device, and part thereof remains is generated.

That is, the aqueous solution of hydrochloric acid may be recovered between the first bipolar membrane 220 and the anion selective-type permeable membrane 230 of the anode cell, and the desalting solution may be recovered between the anion selective-type dialysis membrane 230 and the cation selective-type dialysis membrane 240, and the aqueous solution of lithium hydroxide may be recovered between the cation selective-type separation membrane 240 and the second bipolar membrane 250 of the cathode cell.

In the process of converting into the aqueous solution of lithium hydroxide, as the bipolar electrodialyser, a bipolar electrodialysis stacking device having a plurality of sets of the first bipolar membrane, the anion selective-type dialysis membrane, the cation selective-type dialysis membrane, and the second bipolar membrane described above may be used. Also, the voltage applied per set may be in the range of 1.8 to 2.2 V. The applied current density may be 30 mA/cm$^2$ to 90 mA/cm$^2$. If the current density is lower than 30 mA/cm$^2$, the lithium is transported slowly and the production rate is reduced, and if the current density is more than 90 mA/cm$^2$, heat may be generated to occur damage to the bipolar electrodialysis membrane.

The aqueous solution of lithium hydroxide obtained by the method as above may be crystallized and then separated and dried to obtain lithium hydroxide in powder form.

That is, in order to separate the lithium hydroxide crystals after concentrating and crystallizing the aqueous solution of lithium hydroxide converted by the reaction as shown in Reaction Scheme, for example, vacuum filtration, pressure filtration, centrifugation and the like may be used. At this time, before drying the obtained lithium hydroxide crystals, a step of washing using distilled water to improve the purity may be further comprised. After washing, the obtained precipitates may be dried to obtain lithium hydroxide in powder form.

Hereinafter, preferred examples of the present invention and experimental examples according thereto will be described. However, the following examples are for exemplary purposes only, and the scope of the present invention is not limited thereto.

EXPERIMENTAL GROUP I

Example 1

Brine having the composition shown in below Table 1 was prepared.

TABLE 1

| Classification (mg/L) | Li | Na | K | Ca | Mg |
|---|---|---|---|---|---|
| Brine composition | 1020 | 94430 | 23000 | 8550 | 6490 |

80 L of the brine was passed through an adsorbent comprising aluminum hydroxide.

Next, 30 L of the distilled water was passed through the adsorbent on which lithium was adsorbed to obtain a lithium-containing desorption solution.

30 L of the lithium-containing desorption solution was injected to the electrodialyser to obtain a lithium-containing concentrated solution.

NaOH and Na$_2$CO$_3$ were put in the lithium-containing concentrated solution to remove impurities, and then phosphoric acid was put in the lithium-containing concentrated solution from which impurities were removed to produce lithium phosphate.

The composition of each component with respect to the solution obtained in each process is as shown in Table 2 below.

TABLE 2

| Classification (mg/L) | Li | Na | K | Ca | Mg |
|---|---|---|---|---|---|
| Lithium-containing desorption solution | 950 | 200 | 600 | 60 | 70 |
| Lithium-containing concentrated solution after electrodialysis | 9200 | 2200 | 620 | 530 | 620 |
| After removing impurities | 9150 | 4500 | 520 | <3 | <3 |
| After extracting Lithium phosphate | 340 | 6000 | 540 | <3 | <3 |

Referring to Table 2, the lithium recovery rate after extracting of lithium phosphate from the solution after removing impurities was 96% or more, and the lithium recovery rate from the desorption solution to the final lithium phosphate was 85% or more so that a high yield could be obtained. It was also found that the purity of lithium phosphate after washing after extracting of lithium phosphate was 99% or more.

Therefore, it may be seen that lithium phosphate having a high lithium recovery rate and excellent purity may be produced when lithium phosphate is produced by performing electrodialysis after obtaining a desorption solution using an aluminum hydroxide adsorbent, as in the present embodiment.

Comparative Example 1

Brine having the composition shown in Table 1 of Example 1 was prepared.

Lithium phosphate was produced using 80 L of the brine.

At this time, lithium phosphate was produced in the same manner as in Example 1, except that manganese oxide was used as an adsorbent and hydrochloric acid was used instead of distilled water to obtain a lithium-containing desorption solution.

When manganese oxide is used as an adsorbent, the composition of each step is shown in Table 3 below.

TABLE 3

| Classification (mg/L) | Li | Na | K | Ca | Mg | Mn |
|---|---|---|---|---|---|---|
| Lithium-containing desorption solution | 1200 | 400 | 205 | 1000 | 500 | 1000 |
| Lithium-containing concentrated solution after electrodialysis | 8500 | 2830 | 1450 | 7050 | 3540 | 7050 |

TABLE 3-continued

| Classification (mg/L) | Li | Na | K | Ca | Mg | Mn |
|---|---|---|---|---|---|---|
| After removing impurities | 8400 | 7950 | 1400 | <3 | <3 | <3 |
| After extracting Lithium phosphate | 330 | 9600 | 1410 | <3 | <3 | |

In the process of producing lithium phosphate according to Comparative Example 1, manganese is partially dissolved out due to the use of hydrochloric acid in order to obtain a lithium-containing desorption solution, and thus acts as an impurity.

Therefore, when electrodialysis is performed using the lithium-containing desorption solution of Comparative Example 1, electrodialysis proceeds but the manganese oxide is oxidized to produce solid matter such as $MnO_2$ etc. Such the solid matter becomes the cause which contaminates the membrane or the electrode of the electrodialyser so that there is a problem that the electrodialysis operation is not smooth.

Further, as compared with the present embodiment, since the amount of impurities generated during the producing process is relatively increased, there is a problem that additional materials for the impurity treatment must be input, thereby increasing production costs.

In addition, referring to Table 3, it may be seen that the lithium concentration of the lithium-containing desorption solution is somewhat higher than that of Example 1, but the concentration of lithium comprised in the lithium-containing concentrated solution after electrodialysis is rather lowered. That is, in the case of producing lithium phosphate according to Comparative Example 1, it may be seen that the yield of lithium is a level of 78% from the desorption solution to the step of producing lithium phosphate, which is 9% or more lower than that of Example 1.

Comparative Example 2

Brine having the composition shown in Table 1 of Example 1 was prepared.

100 L of the brine was injected into an electrodialyser to obtain a lithium-containing concentrated solution.

However, after the brine was directly injected to the electrodialyser, the precipitates of NaCl were precipitated. This is because the composition of brine is in the state which is saturated with NaCl.

That is, since the NaCl precipitates contaminate the membrane of the electrodialyser, the electrodialysis process does not progress smoothly, and thus the process of removing the impurities and the process of extracting lithium phosphate could not be proceed.

EXPERIMENTAL GROUP II

Example 1

Brine having the same compositions as shown in Table 4 below was selected among the brine containing lithium to produce simulated brine adjusted to the concentration of brine.

TABLE 4

| Classification | Li | Mg | Ca | Na | K | B | Cl | $SO_4$ |
|---|---|---|---|---|---|---|---|---|
| Content (g/L) | 0.52 | 0.54 | 0.88 | 101 | 5.19 | 0.23 | 160 | 8.46 |

The average density of the brine having the composition shown in Table 4 is calculated as 1.21 g/cm³, and the density of the simulated brine produced was also measured of 1.20 g/cm³. In addition, the pH of the brine having the composition shown in Table 4 is known as 6.90, and the pH of the simulated brine was also adjusted to 6.9.

Lithium was adsorbed on the adsorbent comprising aluminum hydroxide using the simulated brine.

Specifically, an adsorbent comprising aluminum hydroxide was mixed with a binder material to produce a molded article in the form of pellets, and then the molded article was put in a tube sealed upside and downside.

Thereafter, the simulated brine was passed through the tube in which a molded article was put to adsorb lithium on the adsorbent. At this time, 1.0 L or more of simulated brine on the basis of 100 ml of the molded article was passed through.

Next, distilled water was passed through the adsorbent on which lithium was adsorbed to obtain a lithium desorption solution.

FIG. 2 shows the content of each element comprised in the solution obtained according to the flow rate of the distilled water passed through.

Referring to the results of FIG. 2, a lithium desorption solution was obtained by passing 0.3 L or more of distilled water through on the basis of 100 mL of the molded article on which lithium was adsorbed.

The compositions of brine and the desorption solution are shown in Table 5 below.

TABLE 5

| Classification | Li | Mg | Ca | Na |
|---|---|---|---|---|
| Brine | 0.52 | 0.54 | 0.88 | 101 |
| Desorption Solution | 1.02 | 0.11 | 0.10 | 0.58 |

It may be seen that the concentration of lithium dissolved in the lithium desorption solution is 2 times or more higher than that of brine. In addition, the content of impurities such as magnesium and calcium etc. was also lowered.

Next, magnesium was removed by putting $Ca(OH)_2$ of 1.3 equivalents of Mg concentration on the basis of Mg comprised in the desorption solution in the desorption solution. Removal of magnesium includes the Reaction Scheme 6 below.

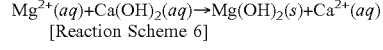
[Reaction Scheme 6]

The concentration of each element before and after the removal of magnesium in the lithium desorption solution is shown in Table 6 below.

TABLE 6

| Classification | Concentration of Mg (g/L) | Concentration of Ca (g/L) | Concentration of S (g/L) | pH |
|---|---|---|---|---|
| Before removal of Mg | 0.11 | 0.10 | 0.30 | 5.98 |
| After removal of Mg | <0.003 | 0.34 | 0.28 | 10.85 |

Next, calcium was removed by putting $Na_2CO_3$ of 1.2 equivalents of Ca concentration on the basis of Ca comprised in the lithium desorption solution from which magnesium is removed in lithium desorption solution from which magnesium is removed.

Removal of calcium includes the Reaction Scheme 7 below.

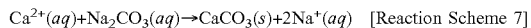

$Ca^{2+}(aq) + Na_2CO_3(aq) \rightarrow CaCO_3(s) + 2Na^+(aq)$ [Reaction Scheme 7]

The concentration of each element before and after the removal of calcium in the lithium desorption solution from which magnesium is removed is shown in Table 7 below.

TABLE 7

| Classification | Concentration of Mg (g/L) | Concentration of Ca (g/L) | Concentration of S (g/L) | pH |
|---|---|---|---|---|
| Before removal of Ca | <0.003 | 0.34 | 0.28 | 10.85 |
| After removal of Ca | <0.003 | <0.003 | 0.28 | 10.68 |

As a result of removing the impurities using calcium hydroxide and sodium carbonate as described above, the concentrations of magnesium and calcium were all lowered to the level of 0.01 g/L or less.

Next, phosphate ($H_3PO_4$) and NaOH were put in the lithium desorption solution from which the impurities were removed.

Specifically, after preparing 1 L of a lithium desorption solution having a lithium concentration of 1.0 g/L from which calcium and magnesium were removed, 1.0 equivalent of NaOH and $H_3PO_4$ on the basis of the lithium concentration comprised in the lithium desorption solution were put in respectively to obtain a solution in which lithium phosphate was precipitated. Thereafter, the lithium phosphate was produced by solid phase separation of the solution precipitated with lithium phosphate.

The precipitation of lithium phosphate includes the Reaction of Scheme 8 below.

$3Li^+(aq) + 3NaOH(aq) + H_3PO_4(l) \rightarrow Li_3PO_4(s) + 3H_2O(l) + 3Na^+(aq)$ [Reaction of Scheme 8]

The lithium phosphate produced by drying after solid phase separation was about 1.96 g Thus, the yield of lithium phosphate produced using the brine in which the lithium concentration is only 0.52 g/L was about 67%.

The yield calculations were performed as follows.

The amount of lithium originally dissolved: 0.52 g/L*1.0 L=0.52 g

The amount of lithium extracted with lithium phosphate: 1.95 g*3*6.94/115.79=0.3506 g (6.94: The atomic weight of Li, 115.79: Molecular Weight of $Li_3PO_4$)

Yield=0.3506 g/0.52 g=0.6743

Comparative Example 1

The same simulated brine same as in Example 1 was used.

Magnesium was removed by putting $Ca(OH)_2$ of 1.3 equivalents of Mg concentration on the basis of Mg comprised in the brine in the brine.

Next, calcium was removed by putting $Na_2CO_3$ of 1.2 equivalents of Ca concentration on the basis of Ca comprised in the brine from which magnesium is removed in the brine from which magnesium is removed.

Next, phosphate ($H_3PO_4$) and NaOH were put in the brine from which the impurities were removed. Specifically, after preparing 1.0 L of brine having a lithium concentration of 0.52 g/L from which calcium and magnesium were removed, 1.0 equivalent of NaOH and $H_3PO_4$ on the basis of the lithium concentration comprised in the brine were put in respectively to obtain a solution in which lithium phosphate was precipitated. Thereafter, the lithium phosphate was produced by solid phase separation of the solution precipitated with lithium phosphate.

The lithium phosphate produced by drying after solid phase separation was about 1.22 g. Therefore, the yield of lithium phosphate produced according to Comparative Example 1 is 42%, so that it may be seen that the yield of lithium phosphate is significantly lower than that of Example 1.

The yield of lithium phosphate calculations were performed as follows.

The amount of lithium originally dissolved: 0.52 g/L*1.0 L=0.52 g

The amount of lithium extracted with lithium phosphate: 1.22 g*3*6.94/115.79=0.2194 g (6.94: The atomic weight of Li, 115.79: Molecular Weight of $Li_3PO_4$)

Yield=0.2194 g/0.52 g=0.4218

Comparative Example 2

In order to confirm the solubility of lithium carbonate at a pH similar to that of the lithium phosphate extraction process, lithium carbonate slurry from the waste battery recycling process was put in water and stirred for 18 hours.

TABLE 8

| Element | Li | Ca | Mg | S | pH |
|---|---|---|---|---|---|
| Content (g/L) | 2.01 | <0.003 | <0.003 | 0.035 | 11.12 |

The solubility of lithium carbonate ($Li_2CO_3$) by distilled water is known to be about 13 g/L (2.5 g/L based on lithium) in the literature, and it was experimentally confirmed that the solubility of the slurry prepared under a strong base condition with a high proportion of $CO_3^{2-}$ ion was also 2.0 g/L or more on the basis of lithium.

That is, lithium phosphate could be produced because it precipitates even in a solution having a lithium concentration of 2.0 g/L or less, but in case of lithium carbonate, it may be seen that it is difficult to be recovered because it is dissolved in a solution having a lithium concentration of 2.0 g/L or less.

EXPERIMENTAL GROUP III

Example 1

Brine having the composition shown in below Table 9 was prepared.

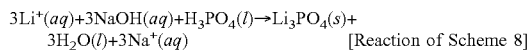

TABLE 9

| Classification (mg/L) | Li | Na | K | Ca | Mg |
|---|---|---|---|---|---|
| Brine composition | 1020 | 94430 | 23000 | 8550 | 6490 |

80 L of the brine was passed through an adsorbent comprising aluminum hydroxide.

Next, 30 L of the distilled water was passed through the adsorbent on which lithium was adsorbed to obtain a lithium-containing desorption solution.

30 L of the lithium-containing desorption solution was injected to the first electrodialyser to obtain the first lithium-containing concentrated solution and the first lithium-containing concentrated solution was injected to the second electrodialyser to obtain the second lithium-containing concentrated solution.

To the second lithium-containing concentrated solution, NaOH and $Na_2CO_3$ were put in 1.2 equivalents of Mg and $Ca(OH)_2$ and $Na_2CO_3$ were put in 1.2 equivalents of Ca, respectively, to remove impurities. Next, lithium carbonate was produced by putting 1.1 equivalents of sodium carbonate in the equivalent amount of lithium to the second lithium-containing concentrated solution from which the impurities were removed.

The composition of each component with respect to the solution obtained in each process is as shown in Table 10 below.

TABLE 10

| Classification (mg/L) | Li | Na | K | Ca | Mg |
| --- | --- | --- | --- | --- | --- |
| Lithium-containing desorption solution | 950 | 200 | 50 | 60 | 70 |
| The First Lithium-containing concentrated solution | 12,500 | 2,900 | 650 | 733 | 860 |
| The Second Lithium-containing concentrated solution | 19,870 | 4,300 | 1,100 | 1,140 | 1,320 |
| After removing impurities | 19,560 | 8,000 | 1,150 | <3 | <3 |
| After extracting Lithium Carbonate | 1,200 | 16,500 | 1,200 | <3 | <3 |

Referring to Table 10, it may be seen that the lithium yield is 77%, and lithium carbonate having a purity of 99% or more may be recovered by washing after extraction with lithium carbonate.

Therefore, it may be seen that lithium carbonate having a high lithium recovery rate and excellent purity may be produced when lithium carbonate is produced by proceeding electrodialysis twice after obtaining a desorption solution using an aluminum hydroxide adsorbent, as in the present embodiment.

Comparative Example 1

Brine having the composition shown in Table 9 of Example 1 was prepared.

100 L of the brine was injected into an electrodialyser to obtain a lithium-containing concentrated solution.

However, after the brine was directly injected to the electrodialyser, the precipitates of NaCl were precipitated. This is because the composition of brine is in the state which is saturated with NaCl.

That is, since the NaCl precipitates contaminate the membrane of the electrodialyser, the electrodialysis process does not progress smoothly, and thus the process of removing the impurities and the process of extracting lithium carbonate could not be proceed.

Comparative Example 2

Brine having the composition shown in Table 9 of Example 1 was prepared.

Lithium carbonate was produced in the same manner as in Example 1, except that the electrodialysis process was proceeded only once using 80 L of the above-mentioned brine.

The composition of each component with respect to the solution obtained in each step is shown in Table 11 below.

TABLE 11

| Classification (mg/L) | Li | Na | K | Ca | Mg |
| --- | --- | --- | --- | --- | --- |
| Lithium-containing desorption solution | 950 | 200 | 50 | 60 | 70 |
| Lithium-containing concentrated solution after electrodialysis | 18000 | 3780 | 950 | 1140 | 1330 |
| After removing impurities | 17500 | 5800 | 930 | <3 | <3 |
| After extracting Lithium Carbonate | 1,300 | 12,000 | 900 | <3 | <3 |

Referring to Table 11, when lithium carbonate is extracted from the lithium-containing desorption solution according to Comparative Example 2, the lithium recovery rate is about 65%. That is, it may be seen that the lithium recovery rate is remarkably reduced by the first electrodialysis compared with the Example 1. In addition, it may be seen that the lithium loss due to the concentrated concentration reduction of the lithium-containing concentrated solution after electrodialysis is relatively large.

EXPERIMENTAL GROUP IV

Example 1

Brine having the composition shown in below Table 12 was prepared.

TABLE 12

| Classification (mg/L) | Li | Na | K | Ca | Mg |
| --- | --- | --- | --- | --- | --- |
| Brine composition | 1020 | 94430 | 23000 | 8550 | 6490 |

80 L of the brine was passed through an adsorbent comprising aluminum hydroxide.

Next, 30 L of the distilled water was passed through the adsorbent on which lithium was adsorbed to obtain a lithium-containing desorption solution.

30 L of the lithium-containing desorption solution was injected to the electrodialyser to obtain a lithium-containing concentrated solution.

The $Ca(OH)_2$ and $Na_2CO_3$ were put in the lithium-containing concentrated solution to remove impurities, and the lithium-containing concentrated solution from which the impurities had been removed was put in a bipolar electrodialyser to convert it into an aqueous solution of lithium hydroxide and then crystallized to produce lithium hydroxide.

The composition of each component with respect to the solution obtained in each process is as shown in Table 13 below.

TABLE 13

| Classification (mg/L) | Li | Na | K | Ca | Mg |
| --- | --- | --- | --- | --- | --- |
| Lithium-containing desorption solution | 950 | 200 | 50 | 60 | 70 |
| Lithium-containing concentrated solution after electrodialysis | 12,500 | 2,900 | 650 | 733 | 860 |

TABLE 13-continued

| Classification (mg/L) | Li | Na | K | Ca | Mg |
|---|---|---|---|---|---|
| After removing impurities | 12,100 | 4,300 | 700 | <1 | <1 |
| Aqueous solution of lithium hydroxide obtained after bipolar electrodialysis | 20,560 | 4,250 | 680 | <1 | <1 |
| After crystallizing aqueous solution of lithium hydroxide | 30,150 | 25,500 | 4,300 | <1 | <1 |

Referring to Table 13, the yield of lithium was about 70%. In addition, the purity of lithium hydroxide was 99% or more, so that lithium hydroxide of high purity could be extracted.

Therefore, as in the present embodiment, it may be seen that lithium hydroxide having a high lithium yield and excellent purity may be produced when lithium hydroxide is produced by conducting electrodialysis after the desorption solution is obtained by using an aluminum hydroxide adsorbent, removing impurities, and then converting it into an aqueous solution of lithium hydroxide through bipolar electrodialysis.

Comparative Example 1

Brine having the composition shown in Table 12 of Example 1 was prepared.

Lithium phosphate was produced by using 80 L of the brine and dissolved in hydrochloric acid, followed by electrodialysis and bipolar electrodialysis. The concentration of each step is shown in Table 14 below.

TABLE 14

| Classification (mg/L) | Li | Na | K | Ca | Mg |
|---|---|---|---|---|---|
| Lithium-containing desorption solution | 1200 | 400 | 205 | 1000 | 500 |
| Lithium-containing concentrated solution after electrodialysis | 8500 | 2830 | 1450 | 7050 | 3540 |
| After removing impurities | 8400 | 7950 | 1400 | <3 | <3 |
| After extracting Lithium phosphate | 330 | 9600 | 1410 | <3 | <3 |
| After dissolving Lithium phosphate in hydrochloric acid | 10,435 | 92 | 4.1 | 0.3 | 0.2 |
| After electrodialysis and bipolar electrodialysis | 19,630 | 440 | 43 | 1.4 | 0.2 |
| After crystallizing aqueous solution of lithium hydroxide | 30,100 | 2,400 | 240 | <1 | <1 |

In the case of producing lithium hydroxide according to Comparative Example 1, since a process of producing lithium phosphate from brine and then dissolving it in hydrochloric acid should be added as described above, in this process, it may be seen that the number of processes to be added is more than in Example 1, and the yield of lithium is also reduced to 60% or less by referring to Table 14.

Comparative Example 2

Brine having the composition shown in Table 12 of Example 1 was prepared.

100 L of the brine was injected into an electrodialyser to obtain a lithium-containing concentrated solution.

However, after the brine was directly injected to the electrodialyser, the precipitates of NaCl were precipitated. This is because the composition of brine is in the state which is saturated with NaCl.

That is, since the NaCl precipitates contaminate the membrane of the electrodialyser, the electrodialysis process does not progress smoothly, and thus the process of removing the impurities and the process of bipolar electrodialysis could not be proceed.

EXPERIMENTAL GROUP V

The adsorption and desorption process was performed as in Example 1 of Experimental Group I above.

At this time, the amount of distilled water was varied on the basis of the volume of adsorbent, and the concentration of lithium in the desorption solution was measured.

The results are shown in below Table 15 and FIG. 4.

As may be seen from the following table, as a result of the experiment according to amount of distilled water, it may be confirmed that the concentration of lithium in the desorption solution is low when it is 0.5 times or less, and it is inefficient in the section of 10 times or more since the amount of lithium released into the desorption solution is little.

TABLE 15

| Volume of distilled water | Concentration of Li (g/L) |
|---|---|
| 0.0~0.3 | 0.648 |
| 0.3~0.5 | 1.15 |
| 0.5~0.6 | 1.47 |
| 0.6~0.7 | 1.49 |
| 0.7~0.8 | 1.39 |
| 0.8~0.9 | 1.29 |
| 0.9~1.0 | 1.18 |
| 1.0~1.1 | 1.07 |
| 1.1~1.2 | 0.975 |
| 1.2~1.3 | 0.901 |
| 1.3~1.5 | 0.807 |
| 1.5~3.0 | 0.570 |
| 3.0~6.0 | 0.341 |

On the basis that the range of volume of distilled water is up to 3 times, the desorption solution within the range of 3 times was sent to the subsequent process, and the remaining amount was mixed again with distilled water in the desorption step and reused.

FIG. 5 shows the lithium concentration in the desorption solution when only up to three times of the desorption solution is continuously sent to the subsequent process. It may be seen that lithium is put in the subsequent process in the form of concentrated than when the entire desorption solution is used.

EXPERIMENTAL GROUP VI

The adsorption and desorption process was performed as in Example 1 of Experimental Group I above.

At this time, the recovery rate of lithium according to the degree of concentration of lithium was calculated as follows.

TABLE 16

| Concentration of Li before concentrating (g/L) | Concentration of Li after concentrating (g/L) | Concentrated solution ratio (%) | Li recovery rate (%) |
|---|---|---|---|
| 1.01 | 3.15 | 18.1 | 67.6 |
| 1.01 | 14.0 | 6.8 | 90.5 |

The concentration of Li in the desalting solution was about 0.1 g/L at the time of the experiment.

As may be seen from Table 16 above, i) the Li recovery rate was around 60% or ii) the concentration ratio of the concentrated solution/desalting solution was >100 or more.

That is, when starting the concentration with a solution of Li 1 g/L, it was confirmed that the concentration of 15 to 35 g/L region was very inefficient.

It may be seen that it is preferable to carry out two-stage concentration according to the concentration of lithium for effective concentration.

EXPERIMENTAL GROUP VII

The adsorption and desorption process was performed as in Example 1 of Experimental Group I above.

At this time, in order to remove the impurities, the conditions of putting additive in were changed as following.

Table 17 below shows the results of comparing $Ca^{2+}$ concentration after putting NaOH in the desorption solution having a different pH for $Ca^{2+}$ removal.

TABLE 17

| Solution Classification | Concentration of Li (g/L) | Concentration of Ca (g/L) | Remarks |
|---|---|---|---|
| pH 3 | 12.399 | 0.810 | |
| pH 9 | 12.387 | 0.811 | Put NaOH in |

It was confirmed that $Ca^{2+}$ has almost no removal effect even when NaOH was added.

Table 18 below compares the removal effect of $Ca^{2+}$ when sodium carbonate is put in instead of NaOH.

TABLE 18

| Solution Classification | Concentration of Li (g/L) | Concentration of Ca (g/L) | Remarks |
|---|---|---|---|
| pH 3 | 12.399 | 0.810 | |
| "Na$_2$CO$_3$ 1.0 equivalent | 11.617 | 0.138 | |
| "Na$_2$CO$_3$ 1.5 equivalent | 11.905 | 0.015 | |
| "Na$_2$CO$_3$ 2.0 equivalent | 11.681 | 0.008 | |
| pH 9 | 12.387 | 0.811 | |
| "Na$_2$CO$_3$ 1.0 equivalent | 12.059 | 0.092 | |
| "Na$_2$CO$_3$ 1.5 equivalent | 11.683 | 0.012 | |
| "Na$_2$CO$_3$ 2.0 equivalent | 11.609 | 0.010 | |

As may be seen from the above Table 18, it may be confirmed that the effect of $Ca^{2+}$ is excellent regardless of pH in the case of sodium carbonate.

The present invention is not limited to the examples and may be embodied in various modifications, and it will be understood by a person of ordinary skill in the art to which the present invention pertains that the present invention may be carried out through other specific embodiments without modifying the technical idea or essential characteristics thereof. Therefore, the aforementioned embodiments are exemplary in all the ways but not limited thereto.

What is claimed is:

1. A method for producing lithium phosphate, comprising:
passing a lithium-containing solution through an aluminum-based adsorbent to adsorb lithium on the aluminum-based adsorbent;
passing distilled water or an aqueous solution having a lower lithium concentration than the lithium-containing solution through the aluminum-based adsorbent on which the lithium is adsorbed to obtain a lithium-containing desorption solution;
putting a phosphorous supplying material in the lithium-containing desorption solution to obtain lithium phosphate;
removing impurities in the lithium-containing desorption solution before the step of putting a phosphorous supplying material in the lithium-containing desorption solution to obtain lithium phosphate,
wherein the concentration of lithium comprised in the lithium-containing desorption solution is in the range of 0.8 g/L to 1.5 g/L.

2. The method of claim 1, wherein
the step of removing impurities in the lithium-containing desorption solution comprises
separating the impurities physically by passing the lithium-containing desorption solution through a filtration membrane having different permeability of monovalent ions and divalent ions;
putting a precipitant in the lithium-containing desorption solution to remove impurities; or
removing impurities by electrodialysis method using a monovalent cation selective permeable membrane.

3. The method of claim 1, wherein
the impurities to be removed in the step of removing impurities are divalent cations.

4. The method of claim 3, wherein
the divalent cation comprises at least one of calcium, magnesium and strontium.

5. The method of claim 2, wherein
the precipitant put in the step of removing impurities is at least one of sodium hydroxide (NaOH), sodium carbonate (Na$_2$CO$_3$), calcium hydroxide (Ca(OH)$_2$), sodium sulfate (Na$_2$SO$_4$), ammonium hydroxide (NH$_4$OH), ammonium carbonate ((NH$_4$)$_2$CO$_3$), ammonium sulfate ((NH$_4$)$_2$SO$_4$) and potassium hydroxide (KOH).

6. The method of claim 2, wherein
the precipitant put in the step of removing impurities is sodium carbonate (Na$_2$CO$_3$).

7. The method of claim 2, wherein
the content of the precipitant put in the step of removing impurities is in the range of 1 equivalent to 2 equivalents on the basis of the equivalent of the impurity ions.

8. The method of claim 1, further comprising
using electrodialyser to concentrate the lithium-containing desorption solution; or
concentrating the lithium-containing desorption solution using a reverse osmosis method; before the step of putting a phosphorous supplying material in the lithium-containing desorption solution to obtain lithium phosphate.

9. The method of claim 8, wherein
the electrodialyser comprises a cathode cell comprising a cathode separation membrane, an anion selective-type permeable membrane which is selectively permeable to anions, a cation selective-type permeable membrane which is selectively permeable to cations, and an anode cell comprising an anode separation membrane are disposed in a sequential order.

10. The method of claim 8, wherein
the concentration of lithium which is concentrated is 1 g/L to 15 g/L.

11. The method of claim 1, wherein
in the step of putting a phosphorous supplying material in the lithium-containing desorption solution to obtain lithium phosphate;
a pH adjusting agent is added together with the phosphorus supplying material.

12. The method of claim 1, wherein
the concentration of lithium in the lithium-containing solution is 0.1 g/L to 2.0 g/L.

13. The method of claim 1, wherein
the aluminum-based adsorbent comprises an adsorbent powder and a binder.

14. The method of claim 1, wherein
the aluminum-based adsorbent comprises aluminum hydroxide.

15. The method of claim 1, wherein
the step of obtaining the lithium-containing desorption solution is
performed by passing the distilled water or an aqueous solution having a lower lithium concentration than the lithium-containing solution through a content of 0.5 to 10 times on the basis of the volume of the aluminum-based adsorbent on which the lithium is adsorbed.

16. The method of claim 15, wherein
in the step of obtaining the lithium-containing desorption solution,
the lithium-containing desorption solution obtained by passing the distilled water or an aqueous solution having a lower lithium concentration than the lithium-containing solution through a content of 0.5 to 3 times on the basis of the volume of the aluminum-based adsorbent on which the lithium is adsorbed is used in subsequent process,
and the desorption solution used more than 3 times is reused for next desorption of the lithium adsorbent.

17. The method of claim 8, wherein
the step of using electrodialyser to concentrate the lithium-containing desorption solution; is performed 2 times or more.

18. A method for producing lithium hydroxide, comprising:
passing a lithium-containing solution through an aluminum-based adsorbent to adsorb lithium on the aluminum-based adsorbent;
passing distilled water or an aqueous solution having a lower lithium concentration than the lithium-containing solution through the aluminum-based adsorbent on which the lithium is adsorbed to obtain a lithium-containing desorption solution; and
injecting the lithium-containing desorption solution into a bipolar electrodialyser to obtain an aqueous solution of lithium hydroxide,
wherein the concentration of lithium comprised in the lithium-containing desorption solution is in the range of 0.8 g/L to 1.5 g/L.

19. A method for producing lithium carbonate, comprising:
passing a lithium-containing solution through an aluminum-based adsorbent to adsorb lithium on the aluminum-based adsorbent;
passing distilled water or an aqueous solution having a lower lithium concentration than the lithium-containing solution through the aluminum-based adsorbent on which the lithium is adsorbed to obtain a lithium-containing desorption solution;
injecting the lithium-containing desorption solution into a bipolar electrodialyser to obtain an aqueous solution of lithium hydroxide; and
carbonating the obtained aqueous solution of lithium hydroxide to obtain lithium carbonate,
wherein the concentration of lithium comprised in the lithium-containing desorption solution is in the range of 0.8 g/L to 1.5 g/L.

20. A method for producing lithium carbonate, comprising:
passing a lithium-containing solution through an aluminum-based adsorbent to adsorb lithium on the aluminum-based adsorbent;
passing distilled water or an aqueous solution having a lower lithium concentration than the lithium-containing solution through the aluminum-based adsorbent on which the lithium is adsorbed to obtain a lithium-containing desorption solution; and
carbonating the desorption solution to obtain lithium carbonate,
wherein the concentration of lithium comprised in the lithium-containing desorption solution is in the range of 0.8 g/L to 1.5 g/L.

* * * * *